July 5, 1927.
E. M. HEWLETT ET AL
1,634,941
SIGNALING SYSTEM
Filed Nov. 22, 1924
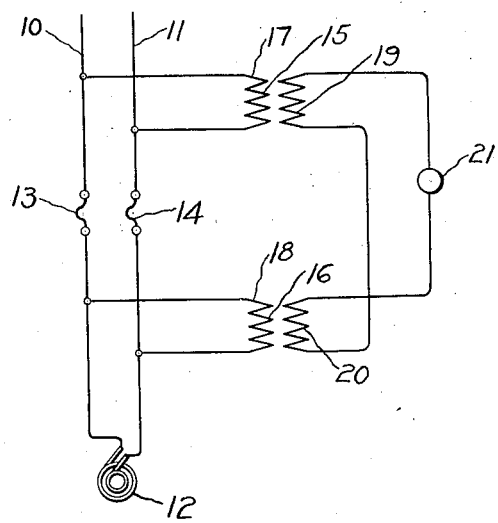
Inventors:
Edward M. Hewlett,
Waldo W. Willard,
by *Alexander S. Lunt*
Their Attorney.

Patented July 5, 1927.

1,634,941

UNITED STATES PATENT OFFICE.

EDWARD M. HEWLETT AND WALDO W. WILLARD, OF SCHENECTADY, NEW YORK, ASSIGNORS TO GENERAL ELECTRIC COMPANY, A CORPORATION OF NEW YORK.

SIGNALING SYSTEM.

Application filed November 22, 1924. Serial No. 751,713.

Our invention relates to signaling systems and has for its object the provision of means for indicating the operation of a protective device in an electric circuit.

More specifically, our invention relates to means for giving a visual or other signal when an electric supply circuit, energized with alternating current or the like, is opened by a protective device, such as a fuse, circuit breakers, etc.

In carrying out our invention we provide two transformers which are connected to the supply mains on opposite sides of the protective device whereby, when the protective device operates, one of the transformers is de-energized and the other transformer thereby caused to operate a suitable signal, such as an electric light.

For a more complete understanding of our invention reference should be had to the accompanying drawing, in the single figure of which is shown in diagrammatic fashion a signaling system embodying our invention.

Referring to the drawing, we have shown our invention in one form as applied to an alternating current electric supply source comprising supply mains 10 and 11 and leading to a translating device to which electric energy is supplied, such as an electric motor 12. Connected in the mains 10 and 11 is suitable protective means, shown as fuses 13 and 14, whereby the supply circuit is opened upon the occurrence of abnormal conditions, such as a short circuit in the electric motor 12.

In accordance with our invention, we provide means whereby a signal is given when the supply circuit is opened by the blowing of one or both of the fuses 13 and 14. Transformers 15 and 16 are provided having their primary windings 17 and 18 connected to the supply mains 10 and 11 on opposite sides of the fuses 13 and 14. The secondary windings 19 and 20 of the transformers have equal electromotive forces induced therein and are connected in series in a closed circuit in opposition to each other, i. e., the terminals of the secondary having like polarities are connected together. Interposed in the connections between the secondary windings is a suitable signaling device, such as an electric lamp 21.

As thus constructed and arranged it will be observed that under normal conditions of operation, electric energy being supplied through the fuses to the electric motor, the two transformers will be energized and since their secondaries are connected in opposition no difference of potential will be impressed on the lamp 21. The lamp, therefore, will not light. Upon the occurrence of abnormal conditions causing one or both of the fuses 13 and 14 to blow and disconnect the electric motor from the source of supply, it will be observed that the transformer 16 will be de-energized. As a result, there will be no electromotive force of secondary winding 20 in opposition to the electromotive force of secondary winding 19 and therefore the voltage of winding 19 will be applied to the lamp 21, whereby it is caused to light and thus indicate that the supply circuit has been opened by the operation of one or both of the protective fuses 13 and 14.

While we have described our invention as embodied in concrete form and as operating in a specific manner in accordance with the provisions of the patent statutes, it should be understood that we do not limit our invention thereto, since various modifications thereof will suggest themselves to those skilled in the art without departing from the spirit of our invention, the scope of which is set forth in the annexed claims.

What we claim as new and desire to secure by Letters Patent of the United States, is:—

1. A signaling system comprising in combination with alternating current electrical supply mains or the like, protective means for opening the circuit through said supply mains upon the occurrence of abnormal conditions therein, a pair of transformers connected to said supply mains on opposite sides of said protective means respectively, whereby one of said transformers is de-energized upon the operation of said protective means, connections whereby the output circuits of said transformers are connected in opposition, a signaling device operated by one of said transformers when the other is deenergized.

2. A signaling system comprising in combination with alternating current electrical supply mains or the like, protective means for opening the circuit through said supply mains upon the occurrence of abnormal conditions therein, a pair of transformers each including a primary and a secondary winding, connections between said primary windings and said supply mains on opposite sides of said protective means respectively, electrical connections between said secondaries whereby said secondaries are connected in opposition, and a signaling device operated by one of said secondaries when the other is de-energized by the operation of said protective means.

3. A signaling system comprising in combination with alternating current electrical supply mains or the like, protective means for opening the circuit through said supply mains upon the occurrence of abnormal conditions therein, a pair of transformers each including a primary and a secondary winding, connections between said primary windings and said supply mains on opposite sides of said protective means respectively, electrical connections whereby said secondaries are connected in opposition to each other in a closed circuit, and a signaling device included in said circuit with said secondaries so as to be operated by one of said secondaries when the other is de-energized by the operation of said protective means.

4. A signaling system comprising in combination with alternating current electrical supply mains or the like, fuses in said mains, a pair of transformers, each including a primary and secondary winding, connections between said primary windings and said supply source on opposite sides of said fuses respectively, connections whereby said secondaries are connected in opposition to each other in a closed circuit, and a signaling device interposed in said circuit with said secondaries so as to be operated by one of said transformers when the primary circuit of the other transformer is opened by the blowing of one or both of said fuses.

In witness whereof, we have hereunto set our hands this 21st day of November 1924.

EDWARD M. HEWLETT.
WALDO W. WILLARD.